US008667732B2

(12) United States Patent
Gleim

(10) Patent No.: US 8,667,732 B2
(45) Date of Patent: Mar. 11, 2014

(54) METHOD FOR THE TREATMENT OF PLANTS USING ELECTROMAGNETIC FIELDS

(76) Inventor: Peter Gleim, Triesen (LI)

( * ) Notice: Subject to any disclaimer, the term of this patent is extended or adjusted under 35 U.S.C. 154(b) by 241 days.

(21) Appl. No.: 13/145,911

(22) PCT Filed: Jan. 28, 2010

(86) PCT No.: PCT/EP2010/050992
§ 371 (c)(1),
(2), (4) Date: Jul. 22, 2011

(87) PCT Pub. No.: WO2010/086367
PCT Pub. Date: Aug. 5, 2010

(65) Prior Publication Data
US 2011/0283607 A1 Nov. 24, 2011

(30) Foreign Application Priority Data
Jan. 29, 2009 (EP) .................................... 09151609

(51) Int. Cl.
*A01G 7/04* (2006.01)
(52) U.S. Cl.
USPC ............................................................ 47/1.3
(58) Field of Classification Search
USPC .................. 47/58.1 SE, 58.1 FV, 58.1 R, 1.3;
204/155, 156, 157.15; 335/284, 299
See application file for complete search history.

(56) References Cited

U.S. PATENT DOCUMENTS

| | | | | |
|---|---|---|---|---|
| 3,822,505 | A * | 7/1974 | Levengood | 47/1.3 |
| 3,952,751 | A * | 4/1976 | Yarger | 607/71 |
| 4,188,751 | A * | 2/1980 | Saruwatari | 47/1.3 |
| 5,060,414 | A * | 10/1991 | Wayland | 47/1.3 |
| 5,077,934 | A * | 1/1992 | Liboff et al. | 47/1.3 |
| 5,097,625 | A * | 3/1992 | Kaneko et al. | 47/56 |
| 6,539,664 | B2 * | 4/2003 | Katsen et al. | 47/1.3 |
| 7,600,343 | B2 * | 10/2009 | Schultheiss et al. | 47/58.1 LS |
| 8,156,686 | B1 * | 4/2012 | Zrodnikov | 47/58.1 SE |
| 2004/0102673 | A1 | 5/2004 | Baugh | |
| 2005/0182287 | A1* | 8/2005 | Becker | 600/13 |
| 2010/0057146 | A1 | 3/2010 | Gleim et al. | |

FOREIGN PATENT DOCUMENTS

EP 0 995 463 A1 4/2000
WO 99/35897 A1 7/1999

OTHER PUBLICATIONS

Pazur, A. et al. (Feb. 3, 2006) "Growth of etiolated barley plants in weak static and 50 Hz electromagnetic fields tuned to calcium ion cyclotron resonance," Biomagnetic Research and Technology, 4 (1): 1-3.

* cited by examiner

*Primary Examiner* — Kimberly Berona
*Assistant Examiner* — Ebony Evans
(74) *Attorney, Agent, or Firm* — Duane Morris LLP; J. Rodman Steele, Jr.; Gregory M. Lefkowitz

(57) ABSTRACT

The invention relates to a method for the treatment of plants using electromagnetic fields and consists in applying pulse sequences to growing plants or the seeds thereof in a pulsed electromagnetic field by means of a pulse generator, wherein the individual pulses have a frequency ranging from 1 to 100 Hz and the amplitude of each individual pulse corresponds to an exponential function or the pulses have envelope curves rising and falling in the form of an arc, wherein the individual pulses are emitted in synchronous or asynchronous groups of pulses having different magnetic flux densities, and wherein the plants are exposed to the pulsating electromagnetic field once to 30 times a day for 1 to 120 minutes each time or continuously for several days. Plant growth, germination and yields are significantly increased in an environmentally friendly manner. Resistance to diseases is increased.

12 Claims, 2 Drawing Sheets

METHOD FOR THE TREATMENT OF PLANTS USING ELECTROMAGNETIC FIELDS

CROSS-REFERENCE TO RELATED APPLICATIONS

This application is a §371 national stage entry of International Application No. PCT/EP2010/050992, filed Jan. 28, 2010, which claims priority to European Patent Application No. EP 09151609.6, filed Jan. 29, 2009, the entire contents of which are incorporated herein by reference.

FIELD OF THE INVENTION

The invention relates to a method for the treatment of plants using electromagnetic fields.

BACKGROUND OF THE INVENTION

From EP 0 995 463A a device is known by means of which biological processes in the human body are influenced by pulsating electromagnetic fields, particularly in order to increase $O_2$ utilization and stimulate metabolic processes, wherein the individual pulses may follow a formularized function.

WO 20081025731 describes a device for generating a pulsed electromagnetic field with periodic pulses with rising and falling envelope curves in dependence on particular measured data of blood microcirculation.

WO 99/35897 discloses an electromagnetic stimulator for influencing plant growth that directly contacts the plant and operates with alternating magnetic fields essentially perpendicular to the axis of the stalk in order to change ionic flux.

Likewise, electric high-voltage fields were successfully used for influencing plant growth already 20 years ago. Up to now, only chemical or natural fertilizers or genetically manipulated plants or genetically manipulated seeds or light treatment have been used for the acceleration of growth or for the roboration of plants against diseases or pests.

Natural fertilizers are problematic since the dosage thereof is difficult (overfertilization). However, natural fertilizers and chemical fertilizers alike probably have no major disadvantages—apart from the fact that they cause enormous costs. The light treatment of phototrophic plants is free from side effects, too. However, this method is characterized by an increased use of energy and is spatially restricted.

As far as genetically manipulated seeds are concerned, it is too early to assess the disadvantages thereof in their entirety since this technology is still being developed, studied and tested. Nevertheless, genetically manipulated corn is already grown worldwide on a large scale although the disadvantages of this method have not been clarified in their entirety, yet (e.g., dying of bee colonies in places where genetically manipulated corn is grown). Generally, this method will certainly continue to be a hardly controllable interference in the natural ecological balance.

SUMMARY OF THE INVENTION

The object of the invention is to provide a method for the treatment of plants using electromagnetic fields in which specific energy inputs result in a significant acceleration of growth or in increased yields by changing the energetic processes in the plant.

The inventive method consists in the treatment of plants using electromagnetic fields and is characterized in that a pulse generator applies pulse sequences to growing plants or the seeds thereof in a pulsed electromagnetic field, wherein the individual pulses have a frequency ranging from 1 to 100 Hz and the amplitude of each individual pulse corresponds to an exponential function or the pulses have envelope curves rising and falling in the form of an arc, wherein the individual pulses are emitted in synchronous or asynchronous groups of pulses having different magnetic flux densities, and wherein a first pulse group has a pulse time of 0.1 to 0.3 seconds with a magnetic flux density of 35 to 100 µT and a second pulse group has a pulse time of 10 to 30 seconds with a magnetic flux density of 2 to 40 µT, and wherein the plants are exposed to the pulsating electromagnetic field once to 30 times a day for 1 to 120 minutes each time or continuously for several days.

The use of a pulsed electromagnetic field generated by a specific pulse results in accelerated plant growth, in a higher resistance of plants to diseases or in increased yields. Electromagnetic fields, just as static magnetic fields, are found in nature on our planet so that the use thereof is free from side effects and safe on account of the extremely low intensities used for this method. The method can be applied to seeds as well as to seedlings or growing plants.

The improved conditioning of the metabolism and of the energy production of the plants achieved thereby results in improved growth and in a roboration of the treated plants or of the seeds.

The inventive method is absolutely environmentally compatible and free from side effects. Moreover, the costs thereof are much lower than those for regular manuring/fertilizing with natural or chemical fertilizers or for light treatment, whereby reasonable yields of food and/or ornamental plants can be cheaply produced, particularly in poor countries or in regions of the world where the climate is unfavorable.

In advantageous embodiments of the method, the pulse sequences are emitted in an area below the plants or seeds, wherein the intermediate material is not a metal.

Other materials that interfere with or shield electromagnetic fields are in the same category as metals.

The treating device consists of a pulse generator and a coil arrangement. The pulse generator does not directly contact the plant. The coil arrangement that emits the pulses into the surroundings is also arranged at a specific distance from the plant or the seeds. In each specific case, said distance depends on the respective plant objects and can be easily fixed by a person skilled in the art. Generally, said distance is 1 cm to 50 cm.

In dependence on the intensity loss of the electromagnetic field with increasing distance (distance d), calculations according to the following formulas are made:

$$P = P_0 \cdot 1/d^2 \quad E = E_0 \cdot 1/d$$

$E_0$=field intensity in free space (no obstacles), also called "free-space field intensity";
$P_0$=power density.

The plants/seeds or the coil arrangement actuated by the pulse generator may also be movably arranged and moved past the pulsing device or vice versa.

As mentioned above, the pulse generator is connected to a pulse-emitting coil arrangement that is, e.g., an object-adapted tabular structure in the form of plates or mats and is also called "applicator".

In this sense, the term "pulse generator" used herein means a unified whole formed by the pulse generator and the pulse-emitting coil arrangement and is used herein in this simplifying manner.

These coils may be circularly arranged within the above-mentioned plates or mats. They may also be arranged in the form of rectangles placed next to each other or partially overlapping each other.

The applicator may also be arranged next to or above the plants/seeds.

Pulses whose amplitude corresponds to an exponential function are preferably used. However, pulses whose envelope curves enclose sinusoidal or cosinusoidal oscillations (as described in WO 2008/025731) may also be used.

The magnetic flux density is advantageously 3 to 99 µT altogether, preferably 3 to 55 µT, and particularly 10 to 60 µT.

The frequency range is preferably 8 to 60 Hz and particularly 8 to 40 Hz.

The pulse sequence preferably consists of individual pulses whose amplitude corresponds to an exponential function.

According to the invention, the individual pulses are emitted in groups of pulses having different magnetic flux densities, e.g., in two pulse groups.

The magnetic flux density of a second pulse group is preferably 3 to 22 µT, particularly 4 to 18 µT when a mat applicator is used or 10 to 65 µT when an intensive coil applicator is used.

In contrast to a large-surface mat applicator (about 70 cm×170 cm), an intensive applicator has a supporting surface of only about 20 to 250 $cm^2$ and can therefore have a magnetic flux density that is 2.5 to 3 times as high. A so-called coil cushion of 20-30 cm×30-50 cm can generate this increased magnetic flux density, too.

The pulse group is preferably emitted 2 to 6 times a minute for 10 to 30 seconds.

The magnetic flux density of a first pulse group is 24 to 99 µT, particularly 24 to 35 µT when a mat applicator is used or 60 to 99 µT when an intensive coil applicator is used.

The pulse group is emitted 2 to 6 times a minute. This pulse group is preferably emitted for 0.1 to 0.2 seconds.

The pulse sequence of the first pulse group is preferably 10 to 90 µT higher than the pulse sequence of the second pulse group, particularly 20 to 70 µT higher.

Even with the higher values of the magnetic flux density of an intensive coil applicator, the pulse sequence of the first pulse group is at least 10 µT higher than that of the second pulse group.

In one embodiment of the invention, pulse groups of different intensities are emitted immediately one after the other so that the magnetic flux density of a second pulse group is 3 to 22 µT that are emitted 2 to 6 times a minute for 10 to 30 seconds. The magnetic flux density of a first pulse group emitted for 0.1 to 0.3 seconds, preferably for 0.1 to 0.2 seconds, is preferably 35 to 100 µT and is emitted alternately with the second pulse group.

In a further embodiment of the invention, the pulses of the second pulse group are continuously emitted for the whole period of time and are superimposed by the higher pulses of the first pulse group 2 to 6 times a minute.

The plants are preferably exposed to the pulsating electromagnetic field in their emergence phase during the first 10 days after their emergence. This can be done during a dark phase or a phase of light.

Treatment once to 10 times a day, particularly once to 3 times a day, is particularly preferred.

Preferred periods of time are 1 to 40 minutes, particularly 5 to 20 minutes, and especially 6 to 15 minutes.

Preferred plants are wheat (such as the Pegassos or Siala so is), rape, corn, barley, tomatoes, and ornamental plants.

The invention also relates to the use of electromagnetic fields for the improvement of the growth and of the robustness of plants or of seeds, characterized by the use of pulsed low-intensity electromagnetic fields having a frequency ranging from 1 to 100 Hz and having individual pulses with amplitudes that correspond to an exponential function or having individual pulses with rising and falling envelope curves, wherein the individual pulses are emitted in synchronous or asynchronous groups of pulses having different magnetic flux densities, and wherein a first pulse group has a pulse time of 0.1 to 0.3 seconds with a magnetic flux density of 35 to 100 µT and a second pulse group has a pulse time of 10 to 30 seconds with a magnetic flux density of 2 to 40 µT, and wherein the plants are exposed to the pulsating electromagnetic field once to 30 times a day for 1 to 120 minutes each time or continuously for several days.

The individual pulses are advantageously integrated into pulse groups having different magnetic flux densities and are emitted as superposing pulses.

The invention also relates to a device for generating electromagnetic fields comprising at least a pulse generator, a controller and an electromagnetic coil, characterized in that the device has pulse sequences that have, at a frequency of 1 to 100 Hz, individual-pulse amplitudes in the form of an exponential function or amplitudes with envelope curves rising and falling in the form of an arc, wherein the pulse sequences consist of pulse groups having different magnetic flux densities, wherein a first pulse group has a pulse time of 0.1 to 0.3 seconds with a magnetic flux density of 35 to 100 µT and a second pulse group has a pulse time of 10 to 30 seconds with a magnetic flux density of 2 to 40 µT, and wherein the magnetic flux density of the first pulse group is at least 10 µT higher than that of the second pulse group.

BRIEF DESCRIPTION OF THE DRAWINGS

In the following, the invention will be explained in greater detail by means of examples. The associated drawings show:

FIG. 3a side view of group according to FIG. 2a;

DETAILED DESCRIPTION

About 100 undressed wheat grains of the Pegassos sort are separately placed on blotting paper in a plastic tray in such a manner that the distances between them are about 1 to 3 cm. A second tray is prepared in the same manner. The trays are placed next to each other on a circular coil arrangement. By means of the BEMER® plus device (manufactured by Innomed AG, Liechtenstein), two pulse groups are emitted to the seeds in both trays for 8 minutes at an interval of one hour each. The magnetic flux density for the basic pulse (second pulse group) is about 32 µT, and the frequency is 33 Hz. These pulse groups are emitted alternately with an additional pulse (first pulse group) of about 99 µT for about 18 to 25 sec (basic pulse) and 100 to 200 msec (additional pulse), respectively. The amplitude of the individual pulses corresponds to an exponential function.

After electromagnetic treatment, the seeds are incubated for one week according to the regulations for the testing of seeds, edition 2008, of ISTA (International Seed Testing Association, Bassersdorf, Switzerland).

Figures 1A, 1B:
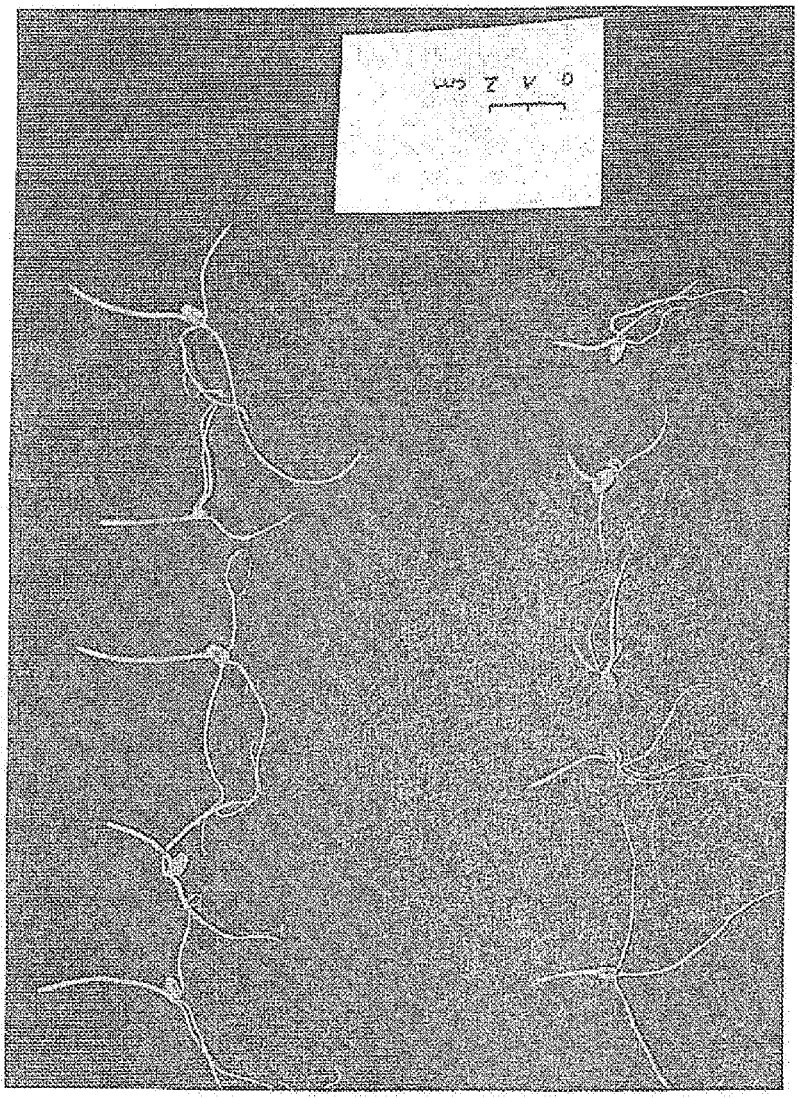
FIG. 1a sprouted wheat grains treated according to the inventive method and separated from each other.
FIG. 1b sprouted wheat grains untreated and separated from each other.
Figure 2A:
FIG. 2a perspective view of group of sprouted wheat grains treated according to the invention.
Figure 2B:
FIG. 2b perspective view of group of untreated sprouted wheat grains.
Figure 3A:
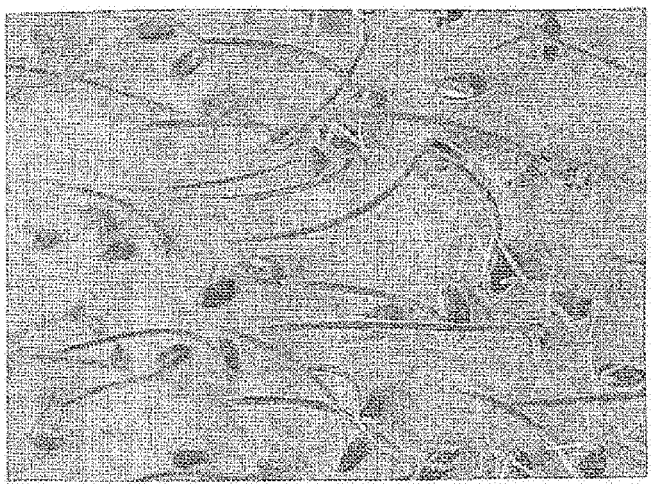
Figure 3B:
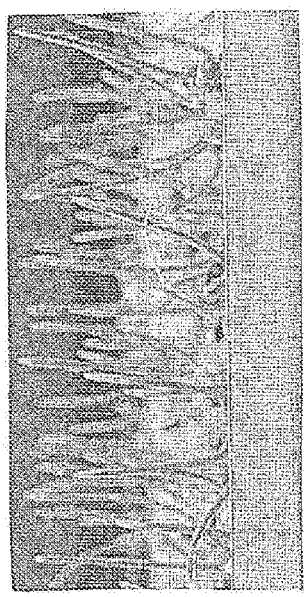
FIG. 3b side view of group according to FIG. 2b.

FIG. 2a shows the seeds treated according to the invention, and FIG. 3a shows the untreated seeds. The seedlings of the treated seeds are mostly twice as long as the untreated ones. This is particularly clearly shown in FIG. 1a compared to FIG. 1b as well as in the side view of FIG. 2b compared to FIG. 3b.

A further result of this example consists in the fact that the treated group of seeds has 3 abnormal and 5 dead seedlings, whereas the untreated group of seeds has 6 abnormal and 8 dead seedlings.

Thus, the inventive treatment both considerably accelerates growth with minimum expenditure of energy and increases the overall yield of viable seedlings.

The yield of spring wheat was determined in a further experiment.

Treatment was performed by means of coil cushions and with increased magnetic flux densities of 31 µT for the second pulse group with a pulse time of 15 sec, and of 82 µT for the first pulse group with a pulse time of 0.15 sec.

The yields in both groups were about 22% higher than that of the control group both in the treatment (8 minutes in each case) during pregermination and of the seedling and in the treatment during pregermination and of the seedling in vertical orientation.

The invention claimed is:

1. Method for the treatment of plants using electromagnetic fields, comprising:
    applying pulse sequences of a pulsed electromagnetic field to growing plants or seeds thereof, wherein individual pulses have a frequency ranging from 1 to 100 Hz and an amplitude of each individual pulse corresponds to an exponential function or the individual pulses have envelope curves rising and falling in the form of an arc, wherein the individual pulses are emitted in synchronous or asynchronous groups of pulses having different magnetic flux densities, and wherein a first pulse group has a pulse time of 0.1 to 0.3 seconds with a magnetic flux density of 24 to 100 µT and a second pulse group has a pulse time of 10 to 30 seconds with a magnetic flux density of 2 to 40 µT, and wherein the pulsating electromagnetic field is applied to the growing plants or seeds once to 30 times a day for 1 to 120 minutes each time for several days or continuously for several days.

2. Method according to claim 1, wherein the pulse sequences are emitted in an area below the plants or seeds, wherein an intermediate material is not a metal.

3. Method according to claim 1, wherein the magnetic flux density of the second pulse group is 3 to 22 µT.

4. Method according to claim 1, wherein the magnetic flux density of the first pulse group is 35 to 99 µT.

5. Method according to claim 1, wherein a pulse group is emitted 2 to 6 times a minute.

6. Method according to claim 1, wherein the first pulse group and the second pulse group simultaneously occur in such a manner that the first pulse group occurs every 10 to 30 seconds 2 to 6 times a minute and that the pulse sequence of the first pulse group is superimposed on the second pulse group.

7. Method according to claim 6, wherein the pulse sequence of the first pulse group is 10 to 90 µT higher than the pulse sequence of the second pulse group.

8. Method according to claim 1, wherein each pulse is emitted by an applicator that is connected to a pulse generator and does not directly contact the plant.

9. Method according to claim 8, wherein the plants or the applicator are movably arranged.

10. Method according to claim 1, wherein the magnetic flux density of the second pulse group is 2.5 to 3 times increased when an intensive coil applicator having an area of 20 to 1500 cm$^2$ is used, wherein the magnetic flux density of the first pulse group is at least 10 µT higher than that of the second pulse group.

11. Method of improving the growth and robustness of plants or seeds, comprising:
    applying pulsed low-intensity electromagnetic fields to plants or seeds, wherein said pulsed low-intensity electromagnetic fields have a frequency ranging from 1 to 100 Hz and individual pulses have amplitudes that correspond to an exponential function or having individual pulses with rising and falling envelope curves, wherein the individual pulses are emitted in synchronous or asynchronous groups of pulses having different magnetic flux densities, and wherein a first pulse group has a pulse time of 0.1 to 0.3 seconds with a magnetic flux density of 35 to 100 µT and a second pulse group has a pulse time of 10 to 30 seconds with a magnetic flux density of 2 to 40 µT, and wherein the pulsating electromagnetic fields are applied to the plants or seeds once to 30 times a day for 1 to 120 minutes each time for several days or continuously for several days.

12. Method according to claim 11, wherein the individual pulses are integrated in pulse groups having different magnetic flux densities and are emitted as superposing pulses.

* * * * *